United States Patent [19]
Venkatraman

[11] Patent Number: 5,923,849
[45] Date of Patent: Jul. 13, 1999

[54] METHOD OF AUDITING COMMUNICATION TRAFFIC

[75] Inventor: Balaji R. Venkatraman, Mountain View, Calif.

[73] Assignee: International Network Services, Sunnyvale, Calif.

[21] Appl. No.: 08/644,644

[22] Filed: May 7, 1996

[51] Int. Cl.$^6$ ........................................... H04B 3/46
[52] U.S. Cl. ........................... 395/200.54; 370/355
[58] Field of Search .................. 395/200.11, 200.54, 395/200.8, 392; 364/550, 551.01; 370/355, 458, 459; 371/67.1, 68.2

[56] References Cited

U.S. PATENT DOCUMENTS

| | | | |
|---|---|---|---|
| 5,042,027 | 8/1991 | Takase et al. | 370/252 |
| 5,488,715 | 1/1996 | Wainwright | 395/182.02 |
| 5,490,199 | 2/1996 | Fuller et al. | 379/1 |

OTHER PUBLICATIONS

B. R. Venkatraman et al., "Performance Analysis of a Method for High Level Prevention of Traffic Analysis Using Measurements from a Campus Network," 10th Annual Computer Security Applications Conference, 1994.
B. R. Venkatraman, "Customer Network Management in SMDS from the Subscriber's Viewpoint," 32nd Annual ACM Southeast Conference, 1994.
B. R. Venkatraman et al., "Simulation of a SMDS Network," Summer Computer Simulation Conference, 1994.
B. R. Venkatraman et al., "Transmission Schedules to Prevent Traffic Analysis," 9th Annual Computer Security and Application Conference, Orlando, 1993.
B. R. Venkatraman et al., "Measurements and Characterization of Traffic in a University Environment," 30th Annual ACM Southeast Conference, 1992.
R. E. Newman–Wolfe et al., "Performance Analysis of a Method for High Level Prevention of Traffic Analysis," 8th Annual Computer Security and Applications Conference, San Antonio, 1992.
R. E. Newman–Wolfe et al., "High Level Prevention of Traffic Analysis," 7th Annual Computer Security and Applications Conference, San Antonio, 1991.
B. R. Venkatraman, "Subscriber Profile Manager: A Customer Network Management Tool," Network Operations and Management Symposium, 1994.

*Primary Examiner*—Thomas Peeso
*Attorney, Agent, or Firm*—Carr & Ferrell LLP

[57] ABSTRACT

The present invention discloses a method for auditing and controlling overt and covert communication traffic in a communication system. The present invention identifies and uses a few parameters to characterize system communication traffic: the volume (V), the frequency (F), the order (O), the (extrinsic) nature (N) of communication between a given pair of nodes and the length (L) (or duration) of transmission. Using one or a combination of the parameters V, F, O, N, L, the invention determines "baseline" system conditions, and audit the behavior and operations of overt and covert communication activity to detect "out-of-baseline" traffic patterns. To further prevent covert channel communications, the present invention introduces an adaptive transmission scheduling policy and a channel handling policy based upon a channel auditing mechanism. The covert channel handling policy of the invention controls the covert channel capacity for noiseless and noisy channels by changing the granularity of change of idle slots in the system. An auditability threshold is used to determine the range of system operations that is accepted as "normal or baseline." When a communication system under supervision is observed to be falling out of "normal or baseline" range, a system audit can be initiated to detect system faults and control overt and covert communication traffic.

16 Claims, 13 Drawing Sheets

METHOD OF AUDITING COMMUNICATION TRAFFIC

BACKGROUND OF THE INVENTION

1. Field of the Invention

The present invention relates to the field of system communication auditing, and in particular to overt and covert communication channel traffic auditing and controlling.

2. Background Art

Communication systems, such as a computer network, often provide the capability to send messages between computers, between users, or between systems, to share resources, and to provide remote access to users. Communications systems are subject to various levels of security. For example, there may be a password required to be an active user on the communication system. There may be restrictions on certain types of data transfers between users. There may be different classes of users with different permissions to use the communication system. Messages may be encrypted so that only authorized users can read the messages. The rules and restrictions of a communications system are referred to here as the system's security policy. A problem with current communications systems is an inability to recognize and prevent certain types of misuse of the system that violate the system security policy. Another problem with current communications systems is an inability to quantify system parameters such as data traffic, timing, storage, and other performance indicators.

A communication system can be said to be made up of "overt" and "covert" channels. A channel is a communication path in the communication system. For example, in a computer network, the conducting medium that connects two computers together (e.g. twisted pair, ethernet, token ring network, etc.) is a physical channel. An overt channel is a logical communication path that is intended to be part of the communication system (e.g. the conducting medium). A covert channel is a communication channel that allow the transfer of information in a manner that violates or breaches the system's security policy.

When someone attempts to circumvent or disobey the security policy of a system, it is said that the communications system is under "attack". The person attacking the system is referred to as an intruder, a malevolent user, a hacker, or simply as an unauthorized user. The communication of an attacker is referred to as an illicit communication.

An example of one way that an attacker uses a covert channel for illicit communication is to attempt to use the presence or absence of messages to encode information. Another method is to use the number of messages exchanged to encode information. The attacker could also have the timing of messages, the identity of the sender or receiver, or the size of the message represent information. If it is possible for an attacker to utilize a system to communicate information as described in the above and like examples, it is said that a covert communication channel exists.

By way of background, attacks on a communication system are either active attacks or passive attacks. Active attacks on a communication system may result in unauthorized information release or modification or denial of resources. That is, the attacker actually accesses the network to send false information or to obtain information in violation of the security policy. The security of an overt communication channel can be compromised in an active attack when an intruder taps into a communication system or network and discards or delays all communication packets going in one or both directions. Thus, a node or a group of nodes that are completely cut off from the rest of the system by the intruder has no way of determining when the next packets should be arriving from its correspondent peer entity.

In a passive attack, the intruder simply releases the contents of a message or mounts a traffic analysis attack to infer user behavior or exploit covert channels. That is, as described above, the presence, timing, size, and/or addressees of data transfers represent traffic characteristics that can be used to communicate using a covert channel.

Covert channels in computer systems are generally classified into two categories, storage and timing covert channels. Covert storage channels involve the direct or indirect modification of storage memory by one process (the sender of a covert message) and the direct and indirect reading of the memory location by another process (the receiver of the covert message). Covert timing channels are exploited when the sender process modulates the use of its own resources in a manner that affects the response of the receiver process. In both cases, for a covert channel to exist, the sender and receiver must share some common computational resource.

A potential system hacker, attacker, or malevolent user may attempt to eavesdrop on the system by establishing a passive monitoring system and gathering information by inference or analyzing the system traffic. For example, by observing either the volume of communication between a source and a destination or the overall communication volume among nodes in the system, an eavesdropper can gain some insight into the behavioral patterns of the system users. Using the insight thus gained, the malevolent user can exploit the system covert channels by collaborating with another malevolent user or a willing accomplice.

Some examples of covert channels can be found in "Transmission Schedules To Prevent Traffic Analysis," 9th Annual Computer Security and Applications Conference, 1993, Orlando, Fla., B. R. Venkatraman and R. E. Newman-Wolfe, incorporated herein by reference.

A typical transmission system and a scheme for using it covertly are illustrated in FIGS. 1, 2 and 3. FIG. 1 shows a slotted time packet transmission system. A slot is the basic time unit during which a given node may send or receive at most one packet. If at most one node of a total of n nodes can transmit per slot, then n(n–1) slots are needed to complete a transmission between all nodes in the system. If all n nodes can transmit in a slot, then at most n slots are needed. On the average, therefore, some number of slots between n and n(n–1) are needed to complete a transmission.

Referring to FIG. 1, a period is a set of successive slots during which one phase of the transmission schedule is carried out. In this model, a period consists of n(n–1) active slots and m idle slots, if n(n–1) slots are needed to complete one phase of a transmission schedule. A cycle comprises a set of successive periods in a cycle.

A covert channel due to transmission frequency can exist in a system such as shown in FIG. 1. FIG. 2 shows an example of a covert channel due to transmission frequency. Referring to FIG. 2, if a user on node i communicates with another user on node j more frequently than he does with other nodes in the system, or exchanges packets with the node at a predetermined frequency, then a covert channel could exist. For example, the user at node i and j could encode some information in the frequency of communication between them. Users may seem to be conducting normal and non-covert communication if only overt channels are monitored. However, the users may be exchanging information surreptitiously in unmonitored covert channels by timing the communication.

In FIG. 2, information can be encoded by timing the transmission of packets. In this case, by computing the interarrival times, i.e., the time interval between the previous message and the current message, the intruder and an accomplice can succeed in creating a covert channel.

Even if the average frequency is held constant by equal volume restrictions and each node agrees to send exactly one packet to every other node per period, the position of the packet transmitted to a particular node within the period could contain information, i.e., by Pulse Position Modulation. The bandwidth of this covert channel could be as large as $\log(n(n-1)) \approx 2 \log n$ bits/period.

FIG. 3 is an example of a covert channel using transmission order. In FIG. 3, a node in a system sends a packet to node A followed by a packet to node B to encode "1" and the reverse order (BA) to encode "0". If the intruder and his accomplice(s) can affect the transmission order in k nodes, then k! transmission orders are possible. Thus, the bandwidth of this covert channel could be as large as $\log(k!) \geq k/2 \log k$ bits per period. In this case, the intruder and his accomplice have encoded information by transmitting packets in a predetermined order so that they can communicate between themselves and with other nodes in the system.

Thus, an intruder may deduce important information from the mere presence of message traffic in a communication system. This information, then, may be used to extract or infer information on the activity or intentions of unsuspecting system members, or to provide a covert channel for communication between an intruder and an accomplice in the system. A secure communication system needs to be designed to prevent traffic analysis, and to prevent subsequent creation or exploitation of network covert channels. Countermeasures need to be implemented to prevent traffic analysis and mask the amount and nature of traffic between origin-destination pairs within the system.

The two basic approaches to communication security are (1) link-oriented security measures, which provide security by protecting message traffic independently on each communication link, and (2) end-to-end security measures, which provide protection for each message from its source to destination.

In a system employing link-oriented measure, encryption is performed independently on each communication link. A link-to-link security mechanism, however, requires that source, destination, and intermediate nodes be physically secure. If one single node becomes corrupt and cooperates with a potential attacker, the message traffic passing through that node will be exposed.

End-to-end security mechanisms do not suffer from the problems of link-to-link mechanisms. However, end-to-end security mechanisms cannot mask traffic patterns and thus cannot prevent all traffic analysis.

Covert channels can be eliminated by avoiding resource sharing. But this can be often impractical. There are, however, a few mechanisms that can be used to achieve protection beyond simple encryption and to prevent traffic analysis, thereby reducing the bandwidth of covert channels, if not eliminating them. In a "No Idle Slots" scheme, if the system is utilized at full capacity as allowed by a protocol, the idle slots can be completely eliminated and so can any possibility of covert channels. However, if a node is using all its capacity, i.e., there are no idle slots in a period, then the scheme is costly because the volume of true traffic may be only a fraction of the capacity being used due to padding.

In a "Capacity Limitation" scheme, the times at which the scheduling policy can respond to variations in the load are restricted. Since the cycle length is considerably longer than the period length, the nodes will have to buffer all the packets generated due to the additional load (in this cycle) and dispatch them at the usual rate. The nodes have to wait until the beginning of a new cycle before the period characteristics can be changed. Thus, a user trying to create a covert channel would be unsuccessful and no information is communicated. Since the cycle boundaries are far apart, the bandwidth of the covert channel is considerably reduced and is noisy. The capacity limitation scheme could introduce severe queuing delays and adversely affect the Quality of Service (QOS) requirements.

SUMMARY OF THE INVENTION

The present invention discloses a method for auditing and controlling overt and covert communication traffic in a communication system. The invention identifies and uses certain parameters to characterize system communication traffic: the volume (V) of communication between a given pair of nodes, the frequency (F) of communication between a given pair of nodes, the order (O) of communication between a set of nodes, the (extrinsic) nature (N) of communication between a given pair of nodes, and the length (L) (or duration) of transmission. Using one or a combination of the parameters V, F, O, N, L, the invention determines "baseline" system conditions, and audit the behavior and operations of overt and covert communication activity to detect "out-of-baseline" traffic patterns. This allows the invention to statistically monitor the security characteristics of overt and covert channel traffic and detect system faults.

To further prevent covert channel communications, the present invention introduces an adaptive transmission scheduling policy and a channel handling policy based upon a channel auditing mechanism. In the preferred embodiment of the invention, an auditability threshold is used to determine the range of "normal or baseline" system operations. The covert channel handling policy of the invention controls the covert channel capacity by changing the granularity of change of idle slots in the system. With coarser granularity, a sender can cause a large enough change in the system load for the number of idle slots to change. This improves the auditability of the channel and reduces the covert channel capacity for noiseless and noisy channels. The invention also develops a method that can be used to derive the values of the granularity of change of idle slots from a desired channel capacity.

DETAILED DESCRIPTION OF THE PRESENT INVENTION

A method of auditing, estimating capacity of covert channels and controlling overt and covert communication traffic is described. In the following description, numerous specific details are set forth in order to provide a more thorough understanding of the present invention. It will be apparent, however, to one skilled in the art, that the present invention may be practiced without these specific details. In other instances, well known features have not been described in detail so as not to obscure the present invention.

In the context of secure communications, security means more than just simple encryption of messages, and often requires prevention of communication traffic analysis. By creating a neutral traffic matrix in which, regardless of the original traffic pattern, even communication levels are observed in the system, and auditing overt and covert channel communications in the neutral traffic matrix, the invention prevents a potential intruder from attacking the communication system and deriving useful information from it.

To provide a neutral traffic matrix, the present invention introduces padding and rerouting. The traffic matrix is padded with dummy packets so that the volume of each inter-node communication is the same. Rerouting sends a packet first to an intermediate node, which forwards the packet to its true destination so that by the second hop, the packet is delivered to its final destination. In the present invention, transport layers of each node agree to forward rerouted messages to their true destination once they are received and initially decoded. The present invention, however, does not require any assumptions regarding packet routing in the network layers.

Thus, the system according to a preferred embodiment of the present invention smoothes the traffic matrix by rerouting and evens the traffic flow by padding to provide spatial neutrality of a communication system and to eliminate variation in the relative volume of communication traffic.

Figure 1:
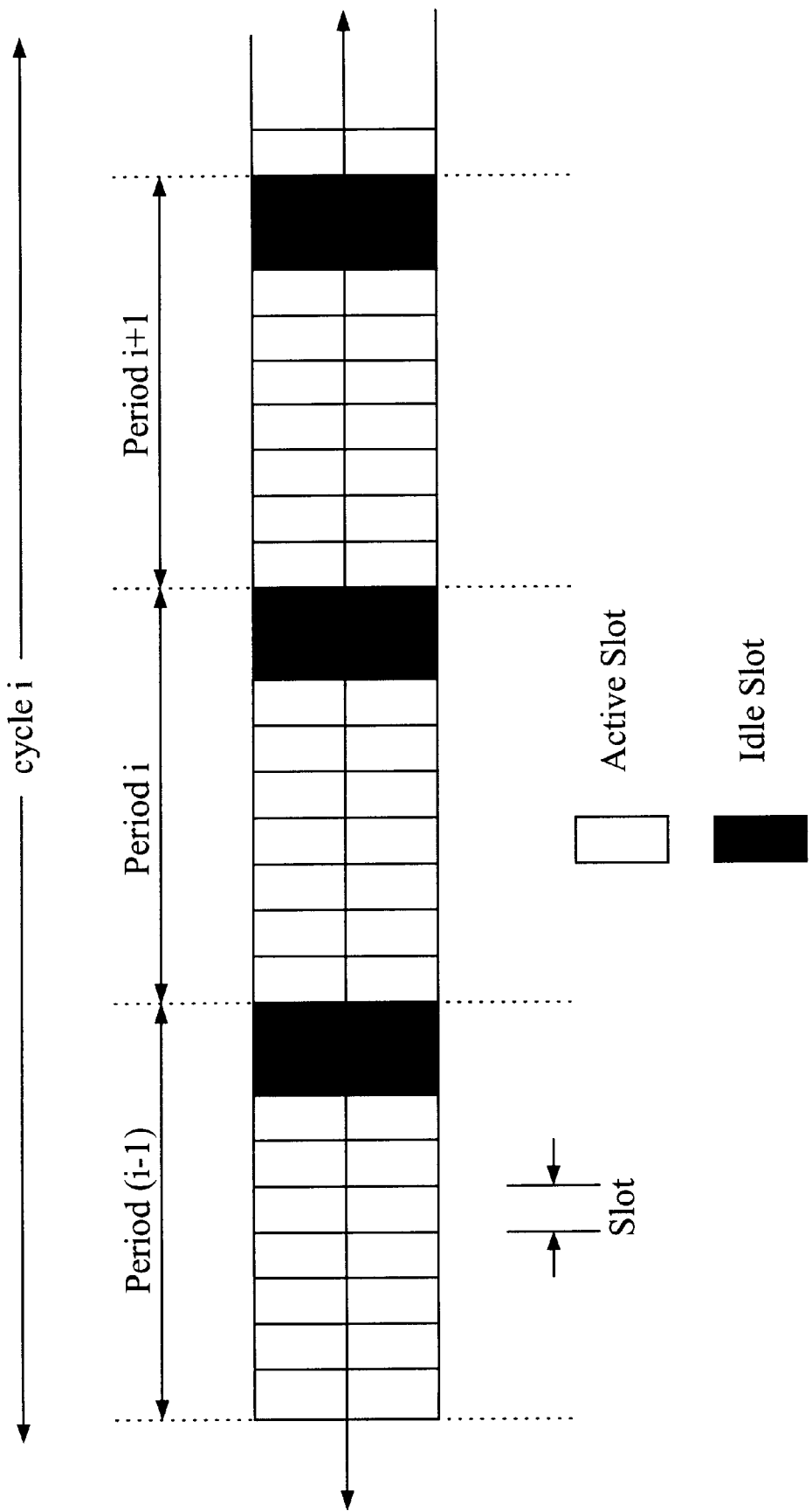
FIG. 1 shows a slotted time packet transmission system.
Figure 2:
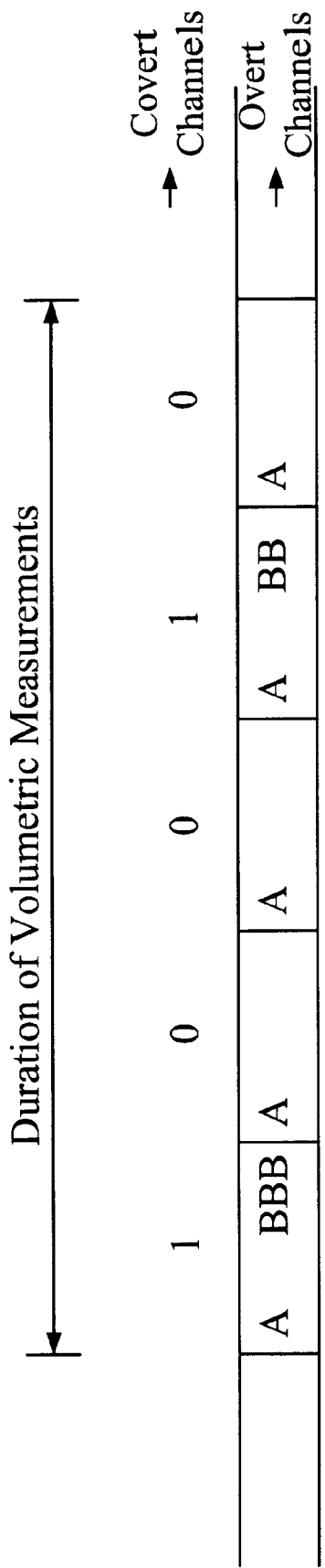
FIG. 2 shows an example of a covert channel using transmission frequency.
Figure 3:
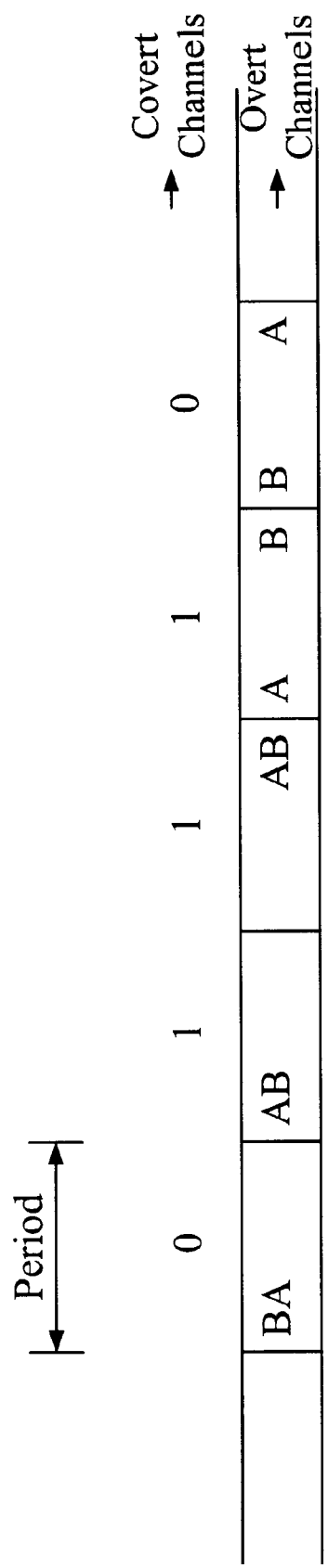
FIG. 3 is an example of a covert channel using transmission order.
Figure 4:
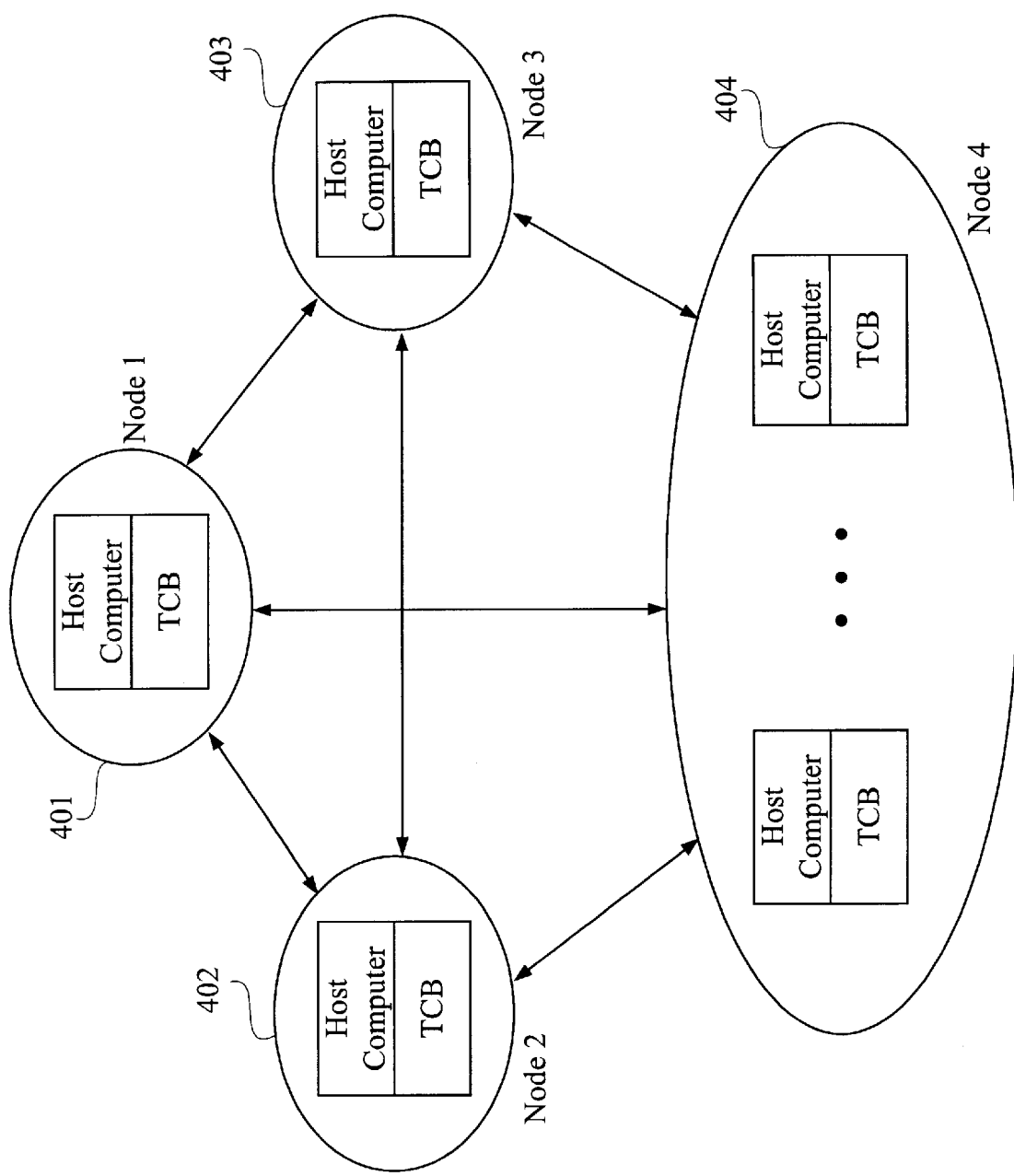
FIG. 4 is a diagram of an example of a network system constructed in accordance with the present invention.

FIG. 4 is a diagram of an example of a network system constructed in accordance with the invention. The embodiment in FIG. 4 illustrates nodes 401, 402, 403, and 404. In FIG. 4, each node comprises a host computer, a TCB and other necessary networking peripherals. A node may comprise a communication network, shown as 404, which comprises a cluster of computers and may use a separate communication protocol within network 404. The embodiment shown in FIG. 4 is not restricted to any particular communication protocol, and may use any suitable protocols including TCP (Transmission Control Protocol) and UDP (User Datagram Protocol) for communication.

Referring to FIG. 4, it is possible for node 401 to send a packet first to intermediate node 403. Node 403 forwards the packet to its true destination 402. In the preferred embodiment of the present invention, transport entities in each of nodes 401, 402, 403, and 404 agree to forward rerouted messages to their true destination once they are received and initially decoded.

A TCB is established to administer central issues for the network, such as authentication and network monitoring or auditing. A separate server can be reserved for this purpose or the TCB function can be implemented on an existing server, such as authentication server or name lookup server.

Spatial neutrality alone is not sufficient to ensure system wide security and there may be possible variations of communication traffic patterns over time. For example, a source may decide to send packets in a burst or spread out its transmission over a period of time. A malevolent user may be able to use timing to encode his messages to his accomplice, thereby creating covert channels.

It is possible to identify and use the following parameters to characterize system communication traffic and audit overt and covert channels:

The volume (V) of communication between a given pair of nodes. In a neutral traffic matrix, the volume of communication between each pair of nodes is the same and the system does not require this information to be secret. By imposing the neutrality criterion on the original traffic matrix, we can eliminate the volume of communication between any pair of nodes as a contributing factor to the covert channel.

The frequency (F) of communication between a given pair of nodes can be used to analyze and exploit a system communication channel. A user can use frequency modulation to exploit covert communication channels.

The Order (O) of communication between a set of nodes in the system. Given that the long term volume of communication and the frequency of communication between each pair of nodes in the system to be the same (due to the V and F criteria discussed above), the order of communication becomes relevant. For example, if a node sends a packet to node i before sending a packet to node j versus sending a packet to node j before sending a packet to node i, then information can be encoded in the order in which nodes communicate with one another.

The extrinsic Nature (N) of communication between a given pair of nodes. Given that the volume, frequency and order of communication are to be same (due to the V, F and O criteria discussed above), the nature of the communication becomes relevant. If the packets are encrypted (end-to-end encryption), the intruder cannot see the contents of the packets. However extrinsic characteristics like packet size can be used to exchange information covertly. For example, a user may send his accomplice a packet of some predetermined size followed by another packet of a different size to exchange some information covertly. These covert channels are eliminated by requiring that the extrinsic characteristic of all packets be the same, by enforcing a fixed packet size, and by encrypting the packets.

The Length (L) (or duration) of transmission. When a single user still can change some of the V, F, O and N parameters just by performing some local operations like increasing the load on the system or choosing to ignore any of the globally accepted parameters, then the user can create a covert channel to communicate with an accomplice. For instance, the user may have an agreement with the accomplice to vary the load on the system at a given time. When the transmission parameters as seen on the system change immediately by significant amounts, the accomplice interprets this as a signal (the eavesdropper is assumed to be continuously monitoring the entire system and can detect any changes in the transmission characteristics).

One or a combination of the parameters V, F, N, O, L can be used to monitor the system behavior or communication patterns and to compile statistical data on a communication system. The data are then used to determine "normal" or "baseline" system characteristics for the system. The baseline characteristics are those that are considered "normal" based upon long-term observation of the system operations and analysis of traffic patterns. For example, by monitoring and gathering traffic information for a communication system on a longer term, an audit trail can be constructed that contains information such as system load, local communication frequencies, temporal and spatial traffic patterns.

A database of audit trails thus constructed can be analyzed to determine "baseline" system conditions. A statistical analysis is performed if necessary. The factors that determine "baseline" conditions for a communication system include one or a combination of the parameters V, F, N, O, L, and any other suitable parameters.

When deviations in system characteristics from these "normal" or "baseline" conditions are observed, an audit may be initiated by a system administrator or any other suitable entity to identify and fix the source of the deviations or potential "faults." It is often possible to correlate an out-of-normal condition identified in a system to a specific problem or fault in a system. For example, a particular communication pattern observed can be attributed to the same fault. If an abrupt decrease in communication load of the system is observed, it might signal a network gateway fault, or a power shutdown. On the other hand, if there is a sudden increase in the load, a malevolent user might be flooding the system with a lot of packets, also known as "denial of service" attack. This kind of attack can seriously delay or interrupt overt communication system.

After a list of communication patterns and their associated faults and diagnoses are compiled, it can be used as a fault dictionary. Comparing an observed out-of-normal communication pattern to known fault patterns in a fault dictionary allows the system operator or maintenance crew to detect, diagnose and report a system fault in a facile and speedy manner. This allows the invention to statistically monitor the security characteristics of overt and covert channel traffic and detect system faults.

Controlling covert channel traffic, however, further requires temporally neutral transmission schedules in which none of <V, F, O, N, L> can be used to encode information. To eliminate such covert channels, globally selected values of <V, F, O, N, L> shall remain the same for an extended period of time and a single user should be prevented from changing these parameters by himself. Any changes should be done by a negotiation process involving at least a majority of nodes, if not all nodes, and the changes should be effected in a controlled manner.

With the five traffic characteristics identified above, a temporally neutral transmission schedule can be developed for an n×n neutral traffic matrix. The system proposed by the invention uses slotted time to transmit packets. The period contains n(n−1) active slots and m idle slots.

Figure 5:
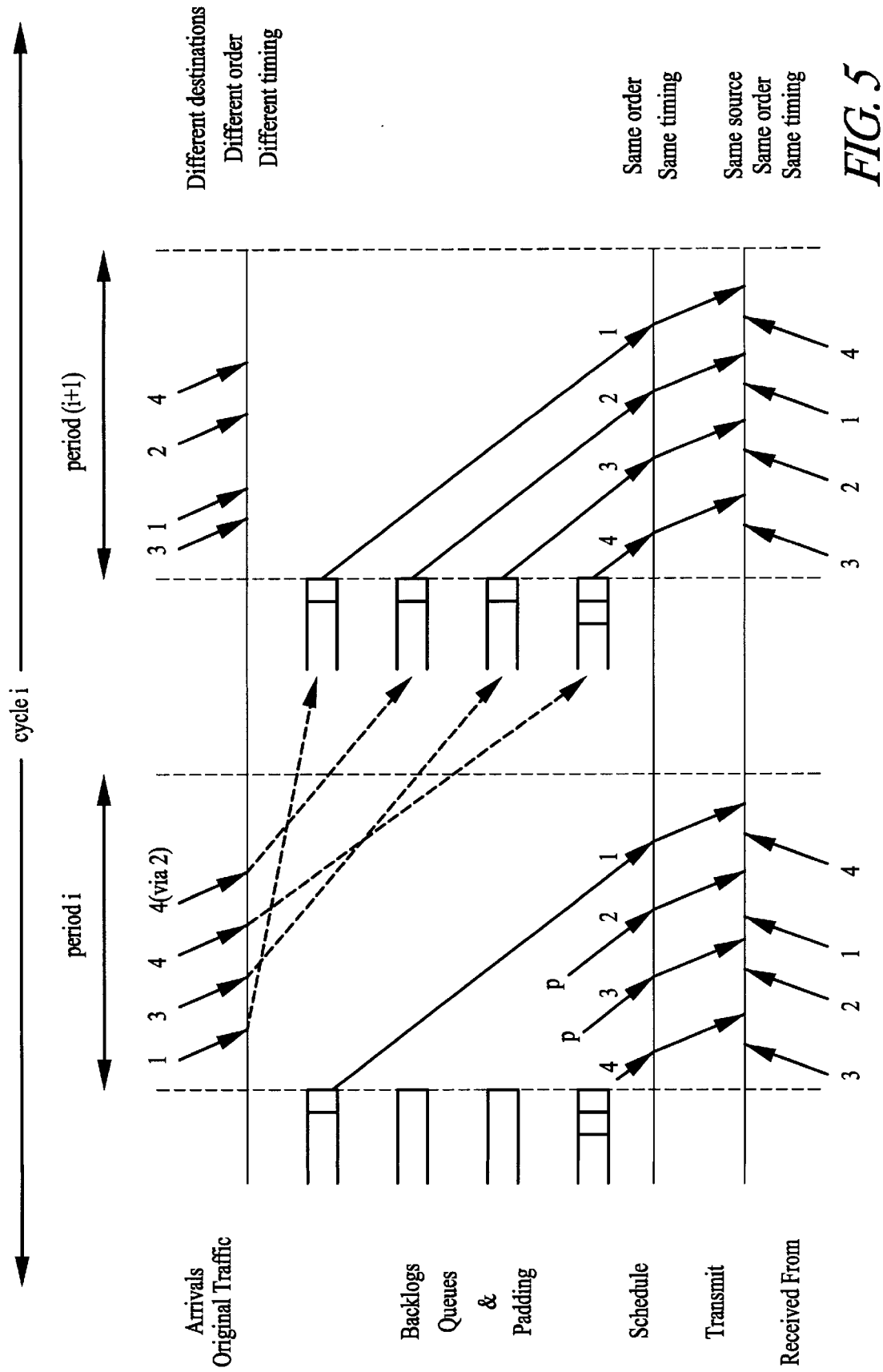
FIG. 5 shows a static transmission scheduling policy.

To provide a spatially neutral traffic flow, the volume of communication between each node is controlled to be same and the frequency and the order of transmission is predetermined and is fixed for the entire duration of a cycle. FIG. 5 shows a static transmission scheduling policy.

In FIG. 5, the horizontal lines indicate the arrival of new packets, scheduling and transmission of packets. In FIG. 5, the slot and period sizes are predetermined and are global values. A period comprises the active slots where all nodes are transmitting packets according to a predetermined schedule. Idle slots may change to satisfy bandwidth demands of the node.

FIG. 5 shows backlog queues associated with each node and the arrival of rerouted packets from intermediate nodes. Since the traffic matrix is maintained neutral, the nodes will receive one packet from every other node in the system per period. In FIG. 5, the new arrivals and the rerouted packets received during period i are eligible for transmission during period (i+1). Nodes 1 and 4 have at least one packet in the buffer eligible for transmission at the beginning of period i and are scheduled for transmission. At the beginning of period i, there are no packets in the backlog buffer for nodes 2 and 3. This implies that there were no new arrivals or rerouted packets for either of the nodes during the period (i−1) and dummy packets are generated on behalf of nodes 2 and 3.

FIG. 5 also shows the arrival of packets from nodes 3, 2, 1 and 4 destined for the local node. One packet is received and transmitted by each node in period i. In period i, a packet is generated in the local node destined for node 4, routed via node 2. The local node then enqueues a packet on (the intermediate) node 2's queue and marks it "destined for node 4." In the next period, node 2 transmits this packet to the appropriate designation (node 4), shown in FIG. 5 as 4 (via 2). The queuing of packets in the virtual queues is shown in dotted lines.

In FIG. 5, the packets that arrived for node 1, 3 and 4 in period i are enqueued in the queues associated with nodes 1, 3 and 4 respectively. The queue for node 4 also shows a packet backlogged from the previous period. The 4(via 2) arrival in period i enqueues a packet in the node 2's queue. Thus each node has at least one packet to transmit in its queue.

The timing and order of transmission (4, 3, 2, 1) and the order of packet arrival (3, 2, 1, 4) remain the same over all periods. The actual order is not important and the order of transmission could be something as simple as round robin or tournament order. However, an order is selected and followed in all periods of the cycle. The volume of communication between each node is the same to satisfy the neutrality criterion.

Thus, the V, F, and O restrictions of the parameter tuple <V, F, O, N, L> are satisfied. If the extrinsic packet characteristics such as packet size and encryption algorithm can be determined and fixed in a communication system, then the N restriction can be satisfied as well. The L restriction, however, is not satisfied since the nodes may change the number of idle slots, thereby changing L, the length (duration) of transmission. The purpose of the idle slots in the period is for the scheduling algorithm to adapt to variations in load and satisfy increased bandwidth requirements.

Figure 6:
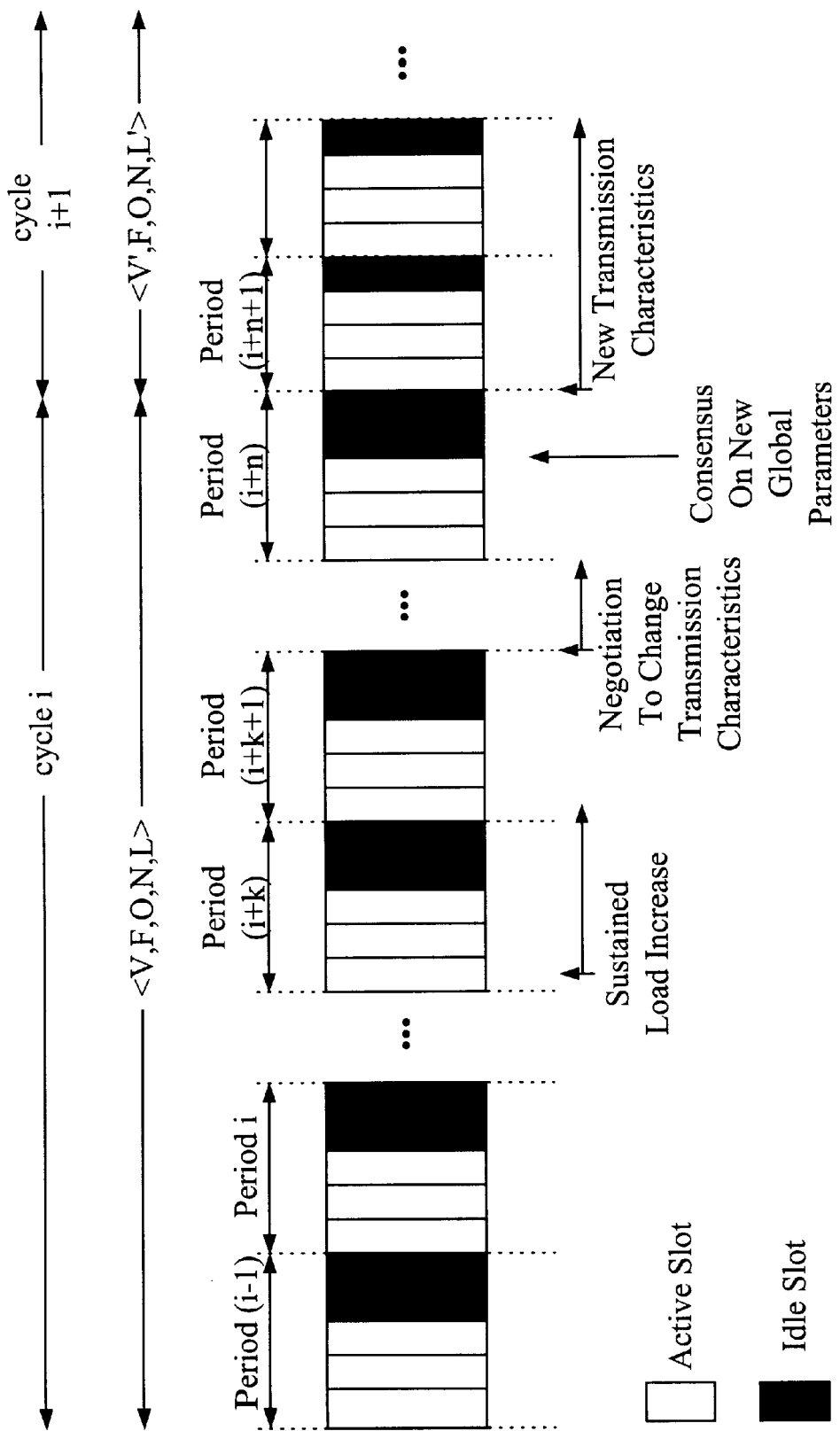
FIG. 6 is an example of changing transmission characteristics in an adaptive scheduling policy.

An adaptive scheduling policy can be used for a system with a variable number of idle slots in a period to adapt to long term fluctuations in system load. FIG. 6 is an example of changing transmission characteristics in an adaptive scheduling policy. In FIG. 6, after a sustained increase in the load, the nodes negotiate and decide to decrease the number of idle slots per period.

When a node or a group of nodes see a need to change the number of idle slots to accommodate additional traffic, they initiate a negotiation process. It is possible for the nodes to agree upon a new number of idle slots for the future periods of the same cycle depending on the current load on the system. Once this parameter is decided, it remains constant for the duration of a cycle.

Figure 7:
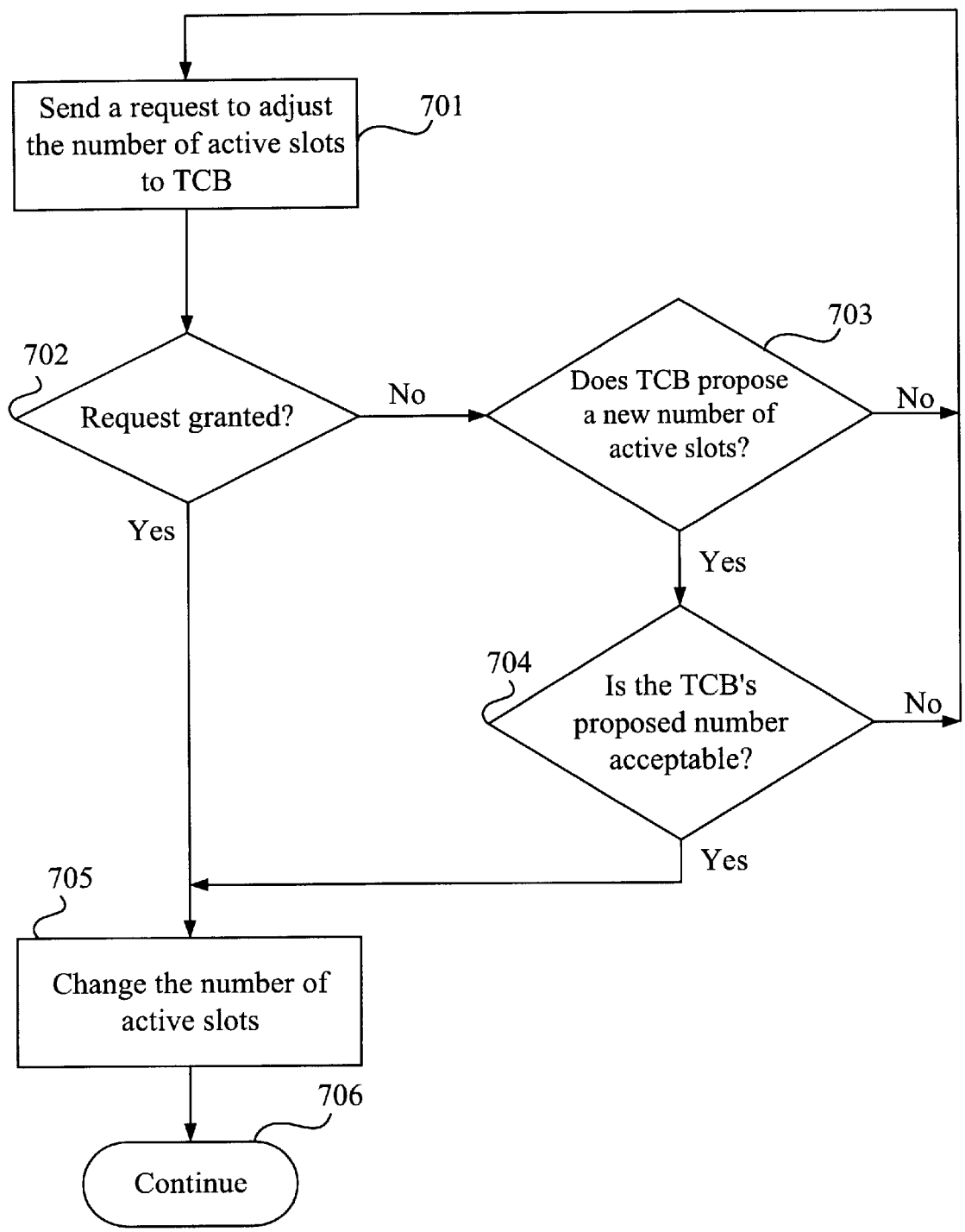
FIG. 7 is a flow chart illustrating a node negotiating to change the number of active slots.

FIG. 7 is a flow chart illustrating a node negotiating to change the number of idle slots. At step 701, a node sends a request to change the number of idle slots to a TCB (Trusted Computing Base). In response, the TCB sends an acknowledgment back to the requesting node with a grant or a denial. If the request is granted at step 702, then the node proceeds to change the number of idle slots at step 705. Otherwise, at step 703, a determination is made as to whether the TCB offers some other number of idle slots for the node. If so, at step 704, the node makes a decision to accept the offer or decline. Otherwise, the node proceeds to step 701.

If the offer from the TCB is an acceptable value to the node, the node proceeds to step 705 where it changes the number of idle slots accordingly. If not, the node proceeds to step 701 to send another request to the TCB. The number of active and idle slots (and therefore the bandwidth allocated) is decided by a global negotiation process in which all nodes participate.

Thus, no single node can affect the active and idle slot times significantly without reaching a consensus with other nodes in the system and the potential of a single node to change the transmission schedule is very limited. For example, a user may try to change the load on a particular node in an attempt to change the transmission characteristics, which could be observed by the accomplice on the system, thus creating a covert channel. In response to the attempt to vary the load and create a covert channel, the scheduling policy initiates the global negotiation protocol to decide on new transmission characteristics, thus minimizing the effects of any single node on the transmission characteristics as well as covert channel capacity.

The idle slot negotiation process as shown in FIG. 7 serves only as an example, and any other global handshake process can be used between nodes and a TCB for the negotiation in alternate embodiments of the invention.

Referring back to FIG. 6, the number of active slots in the period remains the same, but the total period length decreases by one slot as the negotiation decreases the number of idle slots from two to one, thereby increasing the utilization. Thus, while an adaptive scheduling policy allows a system to adjust to load fluctuations, it does not completely prevent changes in the length of the period L and therefore in the transmission characteristic. This possibility prevents the system from guaranteeing the L restriction in <V, F, O, N, L>, and leaving open the possibility of a covert channel.

Since the negotiation for new transmission characteristics is not done frequently and is a global activity, the bandwidth of this covert channel is very low. Also any eventual changes to the transmission schedule after the negotiation process is due to the cumulative effects of several individual node's (user's) actions and view of the system and the effects of any single node on the transmission characteristics is relatively minor. If a node is using all its capacity and wants to increase its traffic to a particular node by k packets, then due to the neutrality criterion, it must increase its traffic by a factor of kn, n being an integer greater than one. Also due to the non-local effect of rerouting, traffic on other nodes are affected as well and there might exist some excess capacity after negotiation. Therefore, the covert channel has low bandwidth and is very noisy.

Nonetheless, covert channels may exist and may be exploited by the users in a communication system. This possibility, thus, poses a potentially serious problem for a secure communication system. An effective method of handling known covert channels is to deter its potential users, and covert channel auditing or monitoring can be used as a main deterrence mechanism. In the present invention, covert channel handling policies are used based upon channel auditing mechanism to reduce covert channel capacity and prevent traffic analysis in an efficient and effective way.

Figure 8:
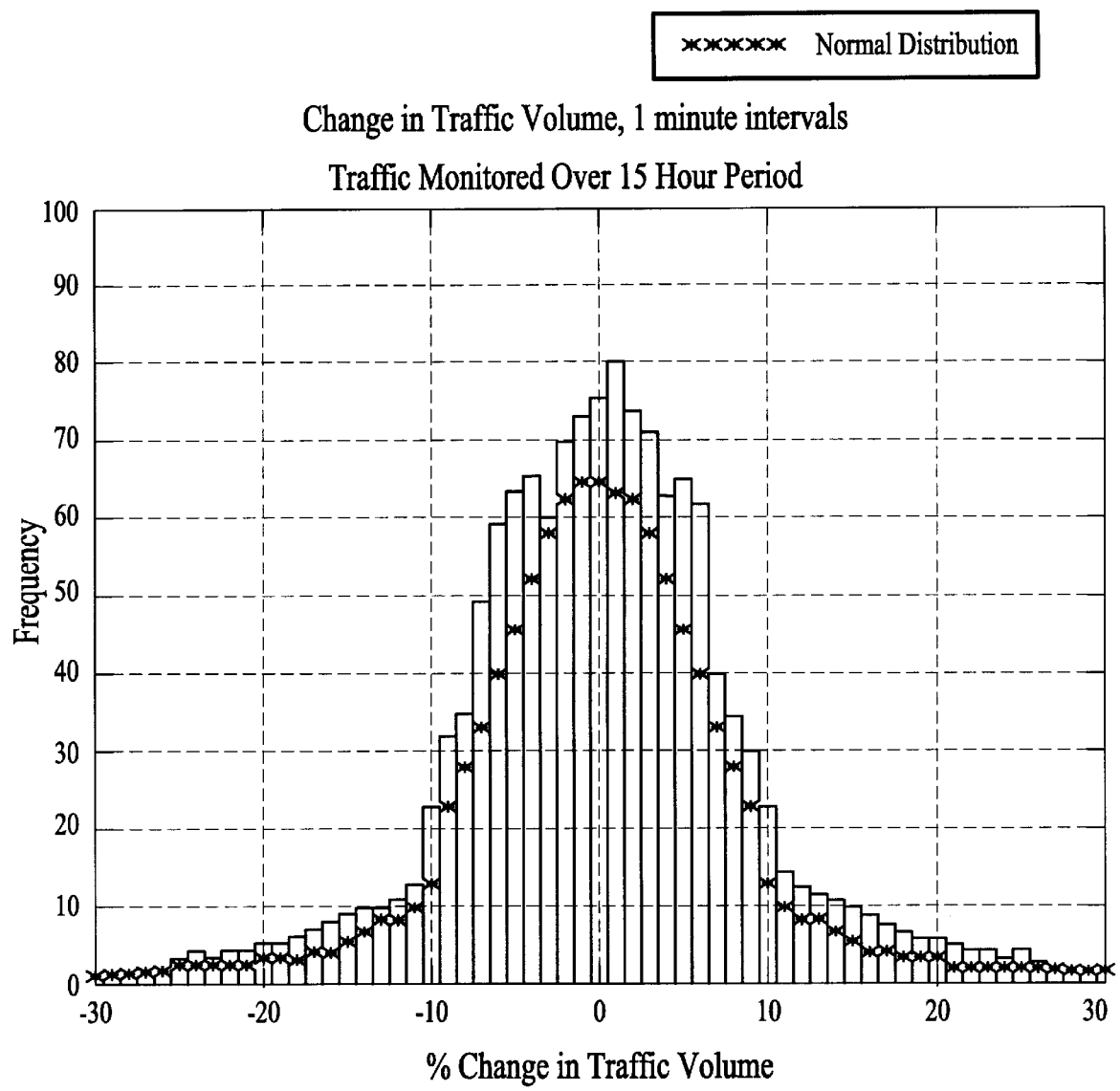
FIG. 8 shows an example of the distribution of the change in system communication traffic volume over one minute intervals.

FIG. 8 shows an example of the distribution of the change in system communication traffic volume over one minute intervals observed on ECSNET (Engineering Consulting Services Network), a subnet of UFNET (University of Florida Network). ECSNET is a 10 Mbps LAN with average packet size 291 bytes. The normal sustained burst volume or baseline volume in the system is approximately 15% for TCP traffic and 22% for UDP traffic under average load conditions. In the example shown, there are 25 nodes in ECSNET and the mean number of packets transmitted per minute is 884 packets.

Two standard deviations for the distribution shown in FIG. 8 is a 23.95 percentage change in traffic volume. Thus, the threshold for auditing the communication traffic is set at 24%, i.e., any variations in the traffic volume that is at least 24% of the current volume is considered out of baseline and audited. However, any other number can be chosen as the threshold value as appropriate in alternate embodiments without departing from the scope of the invention. In the example of FIG. 8, a threshold value lower than 24% can result in noisier channels.

On the average, an overhead of a factor of four is introduced to achieve spatial and temporal system traffic neutrality. Thus, the number of packets exchanged per node per minute is 884×4=3536 packets. Since each node exchanges one packet with every other node in the system each period, there are 3536/24=147.3 periods/minute or 0.407 seconds per period. If the slot time is 0.0005 seconds per slot, then there are 0.407/0.0005=814 slots per period. Since the number of active slots per period is (# of nodes)×(# of every other node)=(25)×(24)=600, the number of idle slots per period is 214 for this load condition.

Since any variations less than ±24% is accepted as normal or baseline in terms of traffic volume, it translates to baseline traffic of 3536±849 packets per node per minute. At the upper bound, 3536+849=4385 packets per node per minute translates to 4385/24=182.71 periods per minute or 0.328 seconds per period for 0.3284/0.0005=657 slots per period with 57 idle slots. Similarly, at the lower bound, 3536−849= 2687 packets per node per minute. This yields 2687/24= 111.958 periods per minute or 0.5359 seconds per period for 0.5359/0.0005=1072 slots per period with 472 idle slots.

The number of idle slots, therefore, ranges from 57 to 472, producing 472−57+1=416 states. This can encode $\log_2 416 = 9$ bits. Thus, the capacity of this channel is 9/60=0.15 bps when the number of idle slots is allowed to change anywhere from 57 to 472 without restrictions.

However, covert channel capacity can be controlled when the system adopts a granularity of change of idle slots, i.e., limits are put on the number of idle slots a node can change from the previous period. For example, if the granularity of change of idle slots is set at $\delta = \pm 100$ from the previous period, then out of 416 idle slot states, nodes are allowed to change the number of idle slots by step size of 100. Thus, for $\delta = \pm 100$, nodes are only allowed to change the number of idle slots by 0, 100, 200, 300, or 400, thereby generating 5 states which are encodable by $\log_2 5 = 3$ bits. This yields a channel capacity of 3/60=0.05 bps.

If the granularity of change of idle slots is set at $\delta = \pm 50$, on the other hand, nodes are allowed to change the number of idle slots by step size of 50, i.e., nodes are allowed to change the number of idle slots by 0, 50, 100, 150, 200, 250, 300, 350, or 400, generating 9 states. Thus, for $\delta = \pm 50$, the covert communication needs 4 bits to encode the states, with resulting capacity of 4/60=0.06 bps.

If the granularity of change of idle slots is further reduced to $\delta = \pm 10$, then there are total of 42 states since nodes are allowed to change the number of idle slots by 0, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, or 410. Covert communication requires 6 bits to encode 42 states and this yields a channel capacity of 6/60=0.1 bps.

Thus, the covert channel capacity can be controlled by changing the granularity of change of idle slots in the system. As another example, if the granularity of change of idle slots is set to be a fraction, $\alpha$, of the basic number of slots in the period, then $\delta = \alpha \times$slots. For example, if $\alpha = 0.1$, then $\delta = 0.1 \times 814 = 81$. The number of states for $\pm 24\%$ threshold can be computed as the number of idle slots is 57 at 24%, and 472 at −24%. Therefore, the number of states at the upper bound is $$\left\lceil \frac{214-57}{81} \right\rceil = 2.$$

Likewise, at the lower bound, the number of states is $$\left\lceil \frac{472-214}{81} \right\rceil = 4.$$

The total number of states then is 2+4+1=7, encoded by $\log_2 7 = 3$ bits. This yields a channel capacity of 0.05 bps.

Table 1 shows the covert channel capacity for a noiseless channel with and without handling for average load case. The analysis of traffic was performed on ECSNET.

TABLE 1

Channel Capacities for a Noiseless Channel

|  | Minimum Load | Average Load | Maximum Load |
| --- | --- | --- | --- |
| Basic Load |  |  |  |
| load, pkt/node/min | 428 | 3536 | 3648 |
| # slots | 6728 | 814 | 790 |
| # idle slots | 6128 | 214 | 190 |
| Unaudited Channels |  |  |  |
| −24% | 325 | 2687 | 2772 |
| +24% | 531 | 4385 | 4524 |
| # idle slots for −24% load | 8260 | 472 | 440 |
| # idle slots for +24% load | 4822 | 57 | 40 |
| Range of idle slots | 3439 | 416 | 401 |
| Channel Capacity, bps | 0.20 | 0.15 | 0.15 |
| Channel Handling |  |  |  |
| idle ±100, Cap. bps | 0.1 | 0.05 | 0.05 |
| idle ±50, Cap. bps | 0.12 | 0.06 | 0.07 |
| idle ±10, Cap. bps | 0.15 | 0.1 | 0.1 |
| $\delta = 0.1 \times$ # slots | 672 | 81 | 79 |
| # states in ±24% load | 7 | 7 | 7 |
| $\delta = 0.1 \times$ # slots, Cap. bps | 0.05 | 0.05 | 0.05 |

As can be seen in Table 1, introducing channel handling policies reduces the number of states to which the system can transition by varying the granularity of change in number of idle slots. With increasing granularity, the number of possible states decreases, thereby reducing covert channel capacity.

Figure 9:
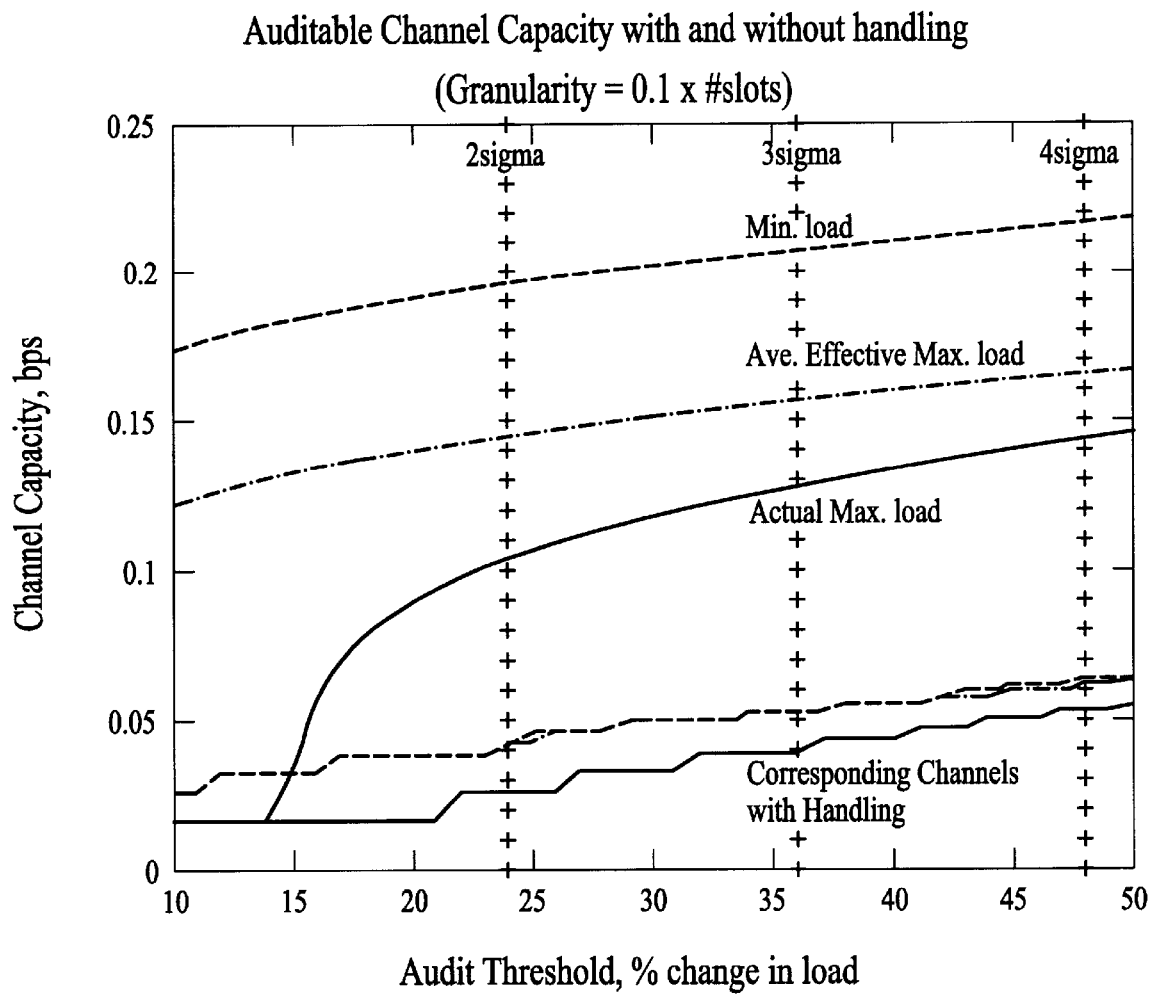
FIG. 9 shows the channel capacities for different auditability thresholds, θ.

FIG. 9 shows the channel capacities for different auditability thresholds, $\theta$. In FIG. 9, the top three curves represent the channel capacities for a noiseless channel without handling for minimum load, average and maximum load. As can be seen in FIG. 9, as the auditability threshold increases, the variability in the system load that is accepted as "normal" or "baseline" increases, leading to higher covert channel capacities. The lower three curves in FIG. 9 represent the channel capacities for a noiseless channel with handling for minimum, average, and maximum loads.

The handling policy of FIG. 9 uses the proportional handling policy where the granularity of change in the number of idle slots, $\delta$, is a fraction of the basic number of slots in the period, i.e., $\delta = \alpha \times$slots wherein $\alpha = 0.1$. It is clear from FIG. 9 that this handling technique reduces covert channel capacity by more than 50% compared to the corresponding channel with no handling.

In the preferred embodiment of the invention, auditability threshold, $\theta$, determines the variation in system load that is accepted as "normal" or "baseline." As discussed above, this threshold is determined by studying the traffic characteristics and is set to a value such that most of the variations that occur during the course of normal system operation is excluded from scrutiny. If the threshold is lower than optimal, the auditing system will experience too many spurious audit events, costing expensive resources and reducing the confidence in audit results, while a higher than optimal threshold can allow some potential covert channel communication to go undetected.

Since auditability threshold, $\theta$, determines the variation in system load and does not differentiate overt channels from covert channels, using auditability threshold, $\theta$, allows a system to implement a monitoring function for overt channels as well as for covert channels.

In this embodiment of the invention, auditability threshold, $\theta$, is determined by the system load. However, in alternate embodiments of the invention, as will be apparent to one skilled in the art, any other suitable system parameter or a combination of a number of parameters can be selected and used as an auditability threshold for monitoring system behavior and overt and covert channel activity.

Although the audit thresholding technique and channel handling polices described above involve performance evaluation and analysis on ECSNET, it will be appreciated by one skilled in the art that the invention is applicable to any communication system and computer network where a plurality of communication nodes require protection from unauthorized intruders. Further, it will also be appreciated by one skilled in the art that the invention is not limited to a particular traffic pattern, and is applicable to any traffic patterns regardless of the underlying communication infrastructure.

Figure 10:
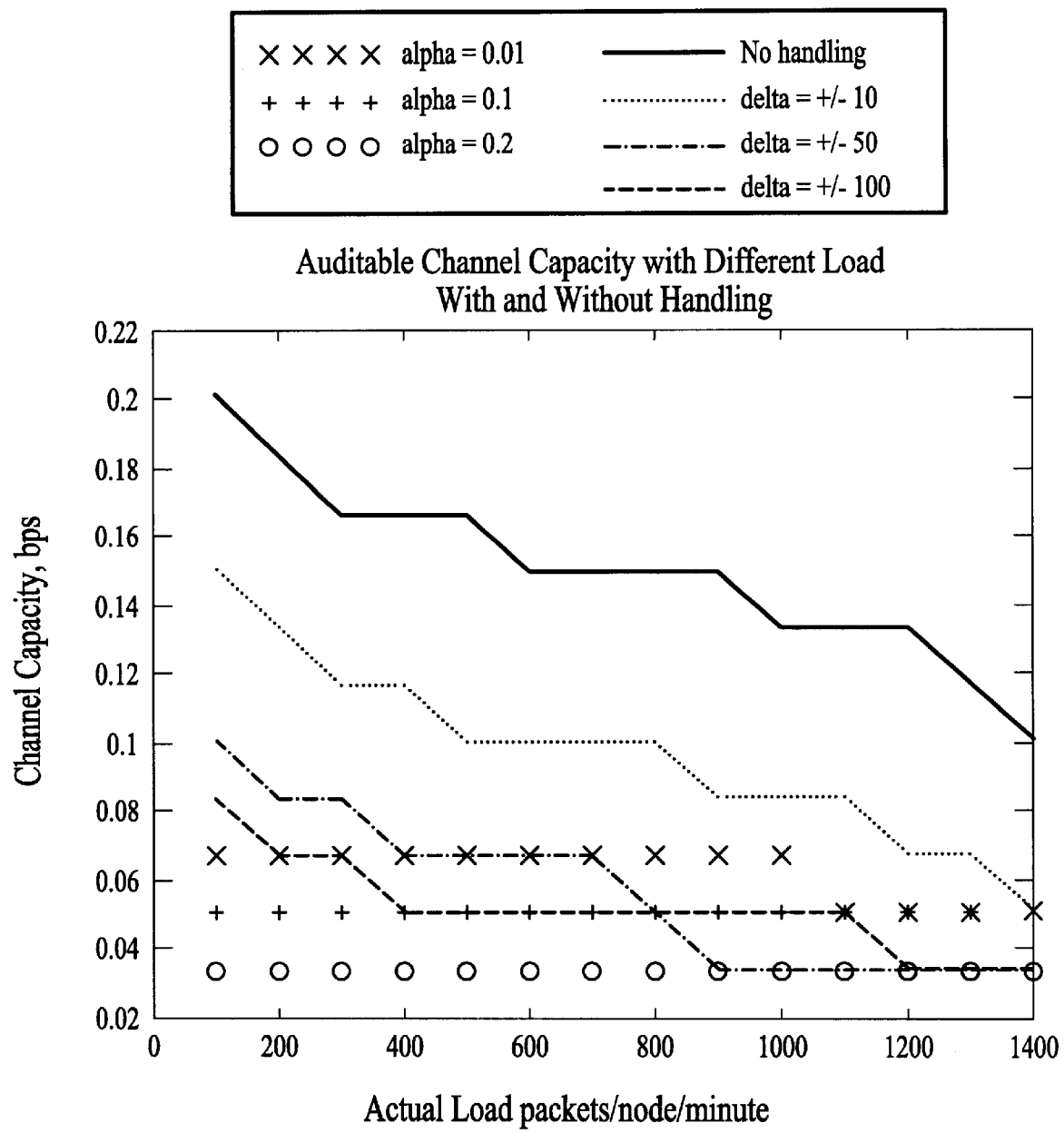
FIG. 10 shows the effect of different handling policies at different load conditions on the covert channel capacity for a noiseless channel.

FIG. 10 shows the effect of different handling policies at different load conditions on the covert channel capacity for a noiseless channel. From FIG. 10, it can be seen that as the load increases, the covert channel capacity decreases. As the granularity of change in the number of idle slots increases, the channel capacity decreases. Also in FIG. 10, proportional handling is seen to be more effective than other simple handling policies.

Figure 11:
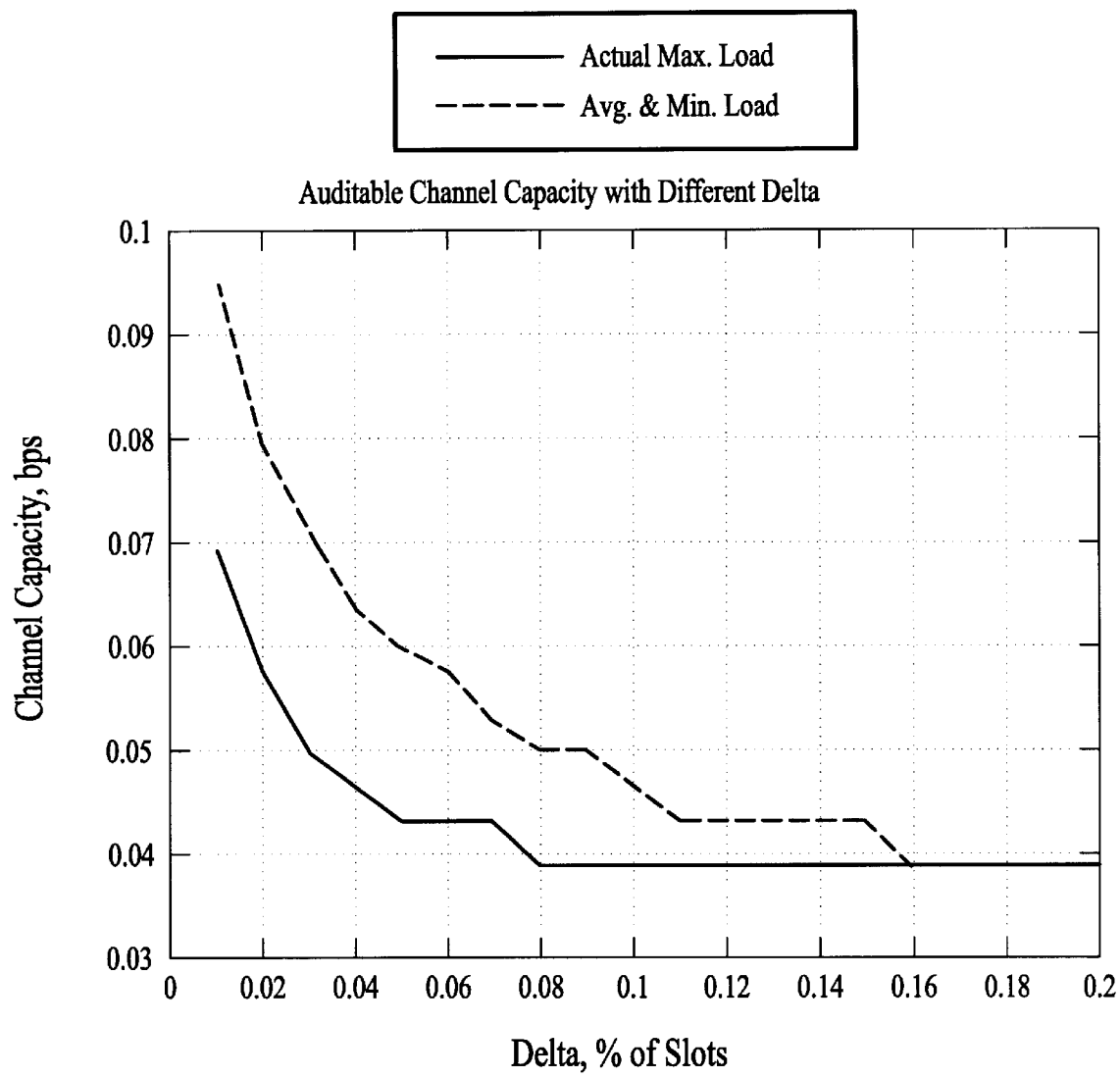
FIG. 11 shows the effect of granularity on covert channel capacity.

FIG. 11 shows the effect of granularity on covert channel capacity. With coarser granularity, a sender can cause a large enough change in the system load for the number of idle slots to change. This improves the auditability of the channel and reduces the covert channel capacity. However, coarser granularity reduces the system responsiveness. Finer granularity allows nodes to change the load by a small fraction of the current load and still manage to transmit a symbol.

Considering the effect of various parameters such as the auditability threshold $\theta$ and the granularity of change in the number of idle slots $\delta$, a method can be developed to determine the value of these parameters for a desired channel capacity, C.

For a given number of nodes in the communication system, n, the slot time Ts, the number of idle slots in a period for any particular load is given by:

$$\# \text{ idle} = \frac{n-1}{Ts \times \text{load}} - n(n-1),$$

where load is in packets per node. Then the range of idle slots is obtained:

$$\text{range} = \left[\frac{n-1}{Ts \times (\text{load} - \theta \times \text{load})} - (n-1)\right] -$$

$$\left[\frac{n-1}{Ts \times (\text{load} - \theta \times \text{load})} - n(n-1)\right] + 1$$

where n(n−1) is the number of active slots. Once the idle slot range is obtained, the maximum covert channel capacity without handling can obtained:

$$C = \frac{\log_2(\text{range}/\delta)}{Tc} bps$$

Thus, using the above relationship, the granularity of change in the number of idle slots can be obtained from a desired value of the covert channel capacity C:

$$\log_2 \delta \geq \log_2(\text{range}) - Tc \cdot C, \text{ or } \delta \geq \frac{\text{range}}{2^{Tc \cdot C}}.$$

Thus, depending on the handling policy selected, the granularity $\delta$ can be determined accordingly. For example, if the proportional handling is used, then $\delta = \alpha \times \text{slots}$, where slots is the total number of slots in a period.

The discussion above involves noiseless channels. However, the present invention can be applied to noisy channels as well. The channel capacity for a noisy channel is less than the channel capacity for noiseless channels for corresponding traffic loads since the 24% change in traffic volume is distributed to every node in the network. Thus the effective change in the traffic volume and the range of variation in the idle slots is also reduced, resulting in reduced channel capacity. As in the noiseless channel case, the channel handling policies can reduce the number of states to which the system can transition, thus reducing the maximum covert channel capacity.

Figure 12A:
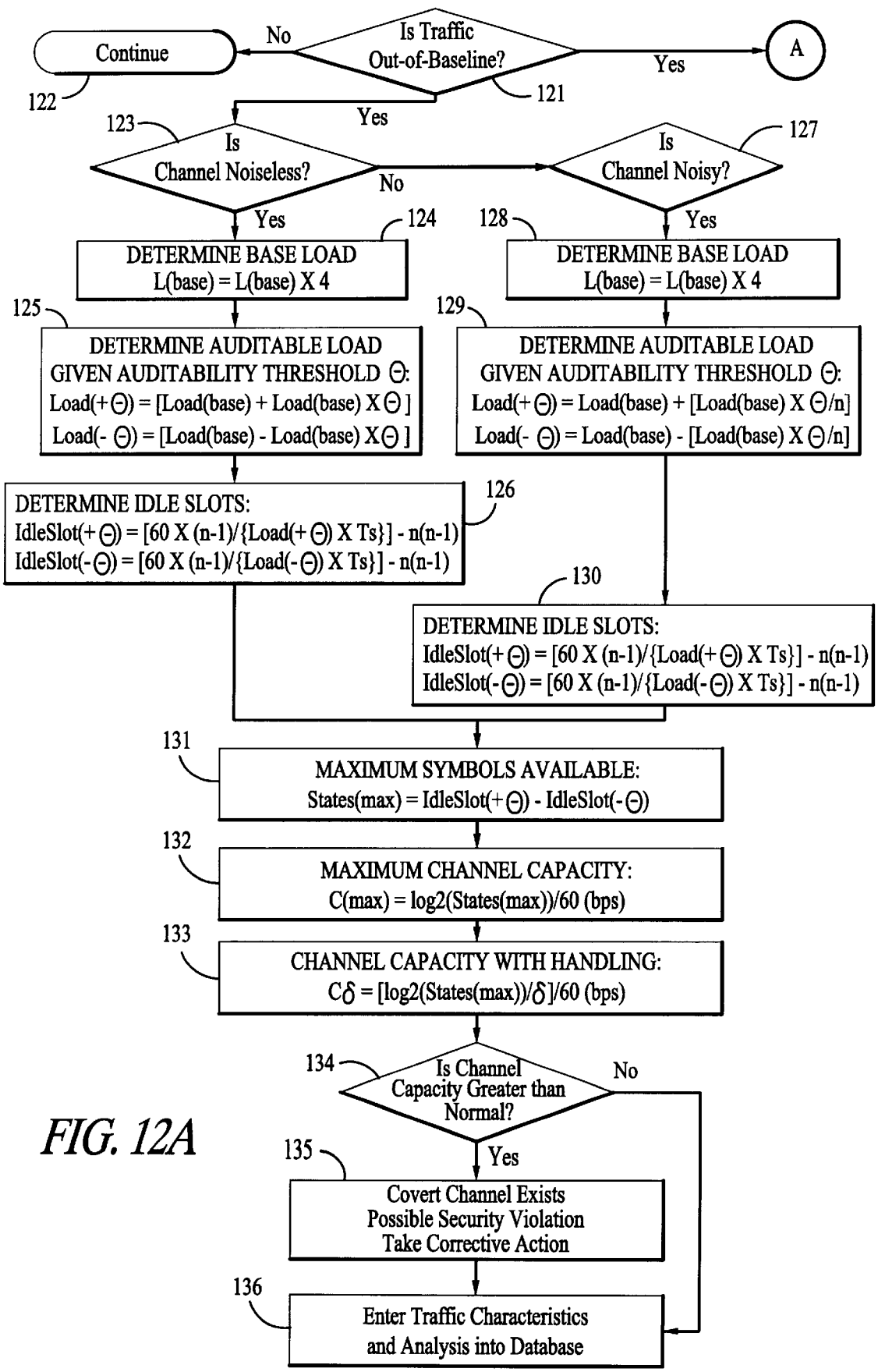
FIG. 12A is a flowchart for monitoring communication traffic and determining channel capacities for noiseless and noisy channels according to preferred embodiment of the invention.

FIG. 12A is a flowchart for monitoring communication traffic and determining channel capacities for noiseless and noisy channels according to a preferred embodiment of the invention. Referring to FIG. 12A, at step 121, a determination is made as to whether the monitored communication traffic is outside of "baseline" conditions. If so, at step 123, a determination is made as to whether the channel for which the channel capacity is calculated is a noiseless channel. If so, at step 124, a base load L(base) is determined by multiplying by an overhead factor of four. At step 125, an upper bound and a lower bound auditable loads are determined from a given auditability threshold $\theta$. At step 126, the numbers of idle slots are obtained for the upper bound base load and the lower bound base load.

If it is determined that the channel is not a noiseless channel in step 123, then at step 127, a determination is made as to whether the channel is a noisy channel. At steps 128, 129, and 130, as in the noiseless case, base loads and the numbers of idle slots are obtained for an upper and a lower bound cases.

At step 131 the number of available symbols is obtained, from which a maximum channel capacity is obtained in step 132. At step 133, channel capacity $C_\delta$ with a channel handling policy is obtained. At step 134, a determination is made as to whether the channel capacity $C_\delta$ falls outside of "baseline" conditions. If so, covert channel may exist and the system security can be violated. Then, if it is desired, an appropriate measure can be taken to control the capacity by, for example, adjusting a parameter such as the granularity of change of idle slots at step 135. If the channel capacity $C_\delta$ is under "baseline" conditions at step 134, the observed traffic characteristics and analysis are entered into an audit database for future use and references at step 136.

Figure 12B:
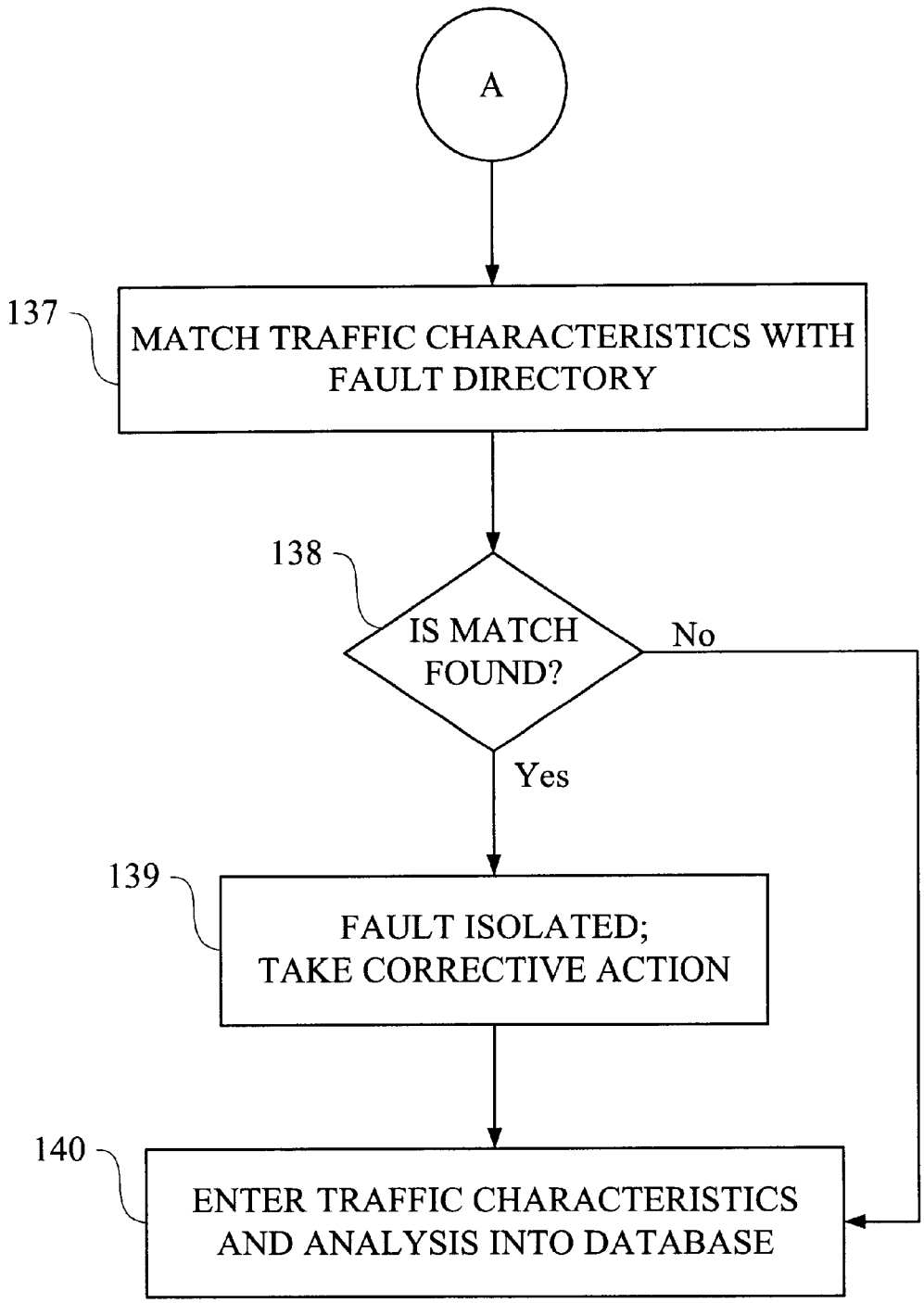
FIG. 12B is a flowchart describing a fault detection method.

Thus, "out-of-baseline" traffic patterns can be effectively monitored and controlled for noisy channels as well as for noiseless channels. Referring back to step 121, if the monitored communication traffic is determined to be outside of "baseline" conditions, it is also possible that the anomaly is due to a fault in the system. Then a fault detection can be initiated as well. FIG. 12B is a flowchart describing a fault detection method. At step 137, the monitored traffic characteristics are compared with known traffic patterns in a fault dictionary or directory to find a match. If a match is found in step 138, the fault can be identified and isolated so that an appropriate corrective action can be taken at step 139. At step 140, the observed traffic characteristics and their analysis are entered into the audit database for future use and references as in step 136.

Thus, a method and apparatus for auditing and controlling overt and covert communication traffic has been described in conjunction with one or more specific embodiments. The invention is defined by the claims and their full scope of equivalents.

I claim:

1. A method of auditing communications traffic in a communications system comprising a plurality of nodes and a plurality of communications channels between said plurality of nodes, said method comprising the steps of:

collecting network characteristics;

changing a granularity of change in the number of idle slots to change said network characteristics; and repeating at predefined intervals.

2. The method of claim 1 wherein said communication characteristics comprise a covert channel capacity.

3. The method of claim 1 wherein said granularity of change is based on communication load of said communication system.

4. A method of auditing communications traffic in a communications system comprising a plurality of nodes and a plurality of communications channels between said plurality of nodes, said method comprising the steps of:

collecting network characteristics; and repeating at predefined intervals, wherein said communication system further comprises a trusted computing base (TCB).

5. A method of controlling a communication system comprising a plurality of communication channels, said method comprising:

using a threshold to specify a "baseline" range of said communication system;

monitoring said threshold to detect said communication system falling outside of said "baseline" range;

using a parameter to change said communication system's characteristic.

6. The method of claim 5 wherein said threshold comes from a fault dictionary.

7. The method of claim 5 wherein said threshold comprises a communication system load.

8. The method of claim 5 wherein said threshold is based on V (volume), F (frequency), N (nature), O (order), and L (length) of communication.

9. The method of claim 8 further comprising the step of controlling V, F, O, N and L parameters.

10. The method of claim 5 wherein said communication system's characteristic is a channel capacity.

11. The method of claim 10 wherein said channel capacity comprises a covert channel capacity.

12. The method of claim 10 wherein a communication on said plurality of communication channels comprises transmission slots during which a packet can be transmitted or received.

13. The method of claim 12 wherein said slots comprise active slots and idle slots.

14. The method of claim 13 wherein said parameter is a granularity of change in the number of idle slots.

15. The method of claim 5 wherein said communication system further comprises a trusted computing base (TCB).

16. The method of claim 15 wherein said step of changing said parameter comprises the steps of:

sending a request to change the value of said parameter to said TCB;

changing said parameter to a new value when said TCB approves the new value.

* * * * *